June 10, 1930.  A. F. MASURY  1,763,001
SEAT UPHOLSTERY
Filed June 23, 1928
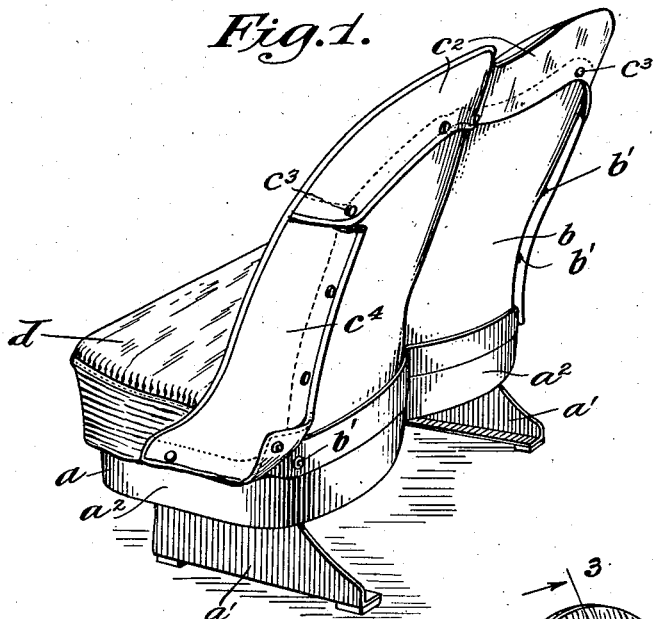
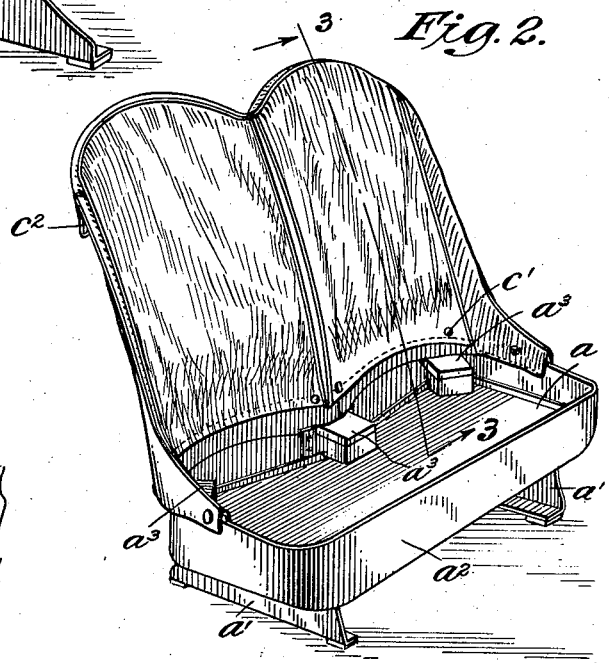
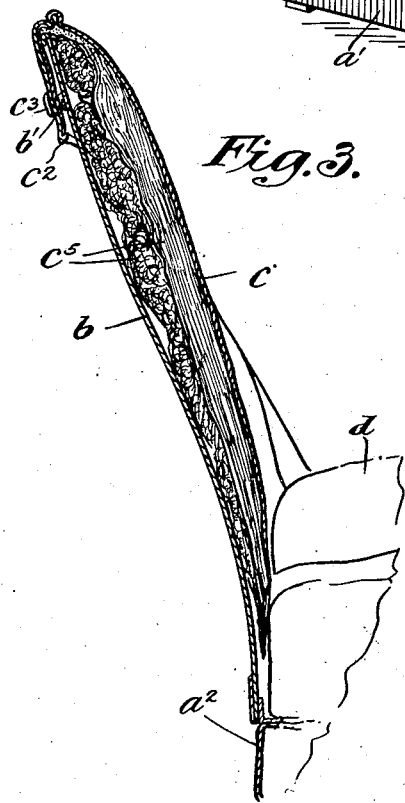
Inventor:
Alfred F. Masury
By his Attorneys
Redding, Greeley, O'Shea & Campbell Patented June 10, 1930

1,763,001

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

SEAT UPHOLSTERY

Application filed June 23, 1928. Serial No. 287,691.

The present invention relates to removable slip covers for seats, particularly those designed for service in passenger carrying vehicles.

An object of the invention is to provide a removable slip cover for a seat of the above character which may be readily applied to or removed therefrom. In order that the manufacture and assembly of this particular portion of the vehicle may be expedited, the seat construction proper is formed with a base of the desired type and pressed metal form fitting backs. These backs are easily made and shaped and are provided with snap fastening elements enabling the upholstered cover to be applied readily.

A further object of the invention is to provide an upholstered slip cover which can be securely fastened to the seat frame and back and is readily removable therefrom as well as being fully as comfortable as the usual upholstered seat. Further objects will appear as the invention is described more fully and reference will now be had to the accompanying drawings, wherein:

Figure 1 is a perspective rear view of a double seat frame provided with an upholstered slip cover in accordance with the present invention.

Figure 2 is a perspective front view of the seat shown in Figure 1, showing the manner in which the upholstered slip cover is secured at the front.

Figure 3 is a view in section, taken on line 3—3 of Figure 2.

Referring to the above drawings, $a$ designates a base provided with suitable supporting pedestals $a'$ at either side thereof. In the form shown, this base is of a type capable of carrying a double seat, and the usual side walls $a^2$ for receiving the seat cushion are provided. Housings $a^3$ are carried by the side walls $a^2$ and provide a yielding nonmetallic connection between the side walls and the base $a$. Since this forms no part of the present invention further description of this connection is deemed unnecessary.

Pressed metal form fitting backs $b$ are carried by the side walls $a^2$ and are shaped to provide the desired rest for the occupant of the seat. On the rear of these backs, snap fastening elements $b'$ are provided and serve to anchor the slip cover to the seat as described hereinafter.

Upon the backs, a slip cover $c$ is mounted, it being provided with snap fastening elements $c'$ at the lower extremity of the front side thereof for securing the slip cover to the front of the backs. At the rear an upper flap $c^2$ is provided for receiving the upper extremities of the backs. Snap fastening elements $c^3$ on this flap $c^2$ cooperate with the snap fastening elements $b'$ to secure the slip cover to the backs. Side flaps $c^4$ may also be provided and are secured to the snap fastening elements $b'$ in a manner similar to the flaps $c^2$. The slip cover is suitably upholstered as indicated at $c^5$, the upholstering forming an integral part of the slip cover so that it may be removed as a unit when the cover is removed. A removable cushion $d$ for the seat is provided, as shown in Figures 1 and 3. By means of the above described construction, the upholstering of the seat is rendered an operation entirely separate and distinct from the actual construction of the frame. The latter is installed as a unit upon the vehicle and the upholstery, having been previously made, is applied to the seat frames with no more trouble than the cleaning thereof. It will be apparent that the specific form of seat cover may be varied to suit individual requirements and the invention is not to be limited, save as defined in the appended claim.

I claim as my invention:

A cover for a seat having a removable seat portion and a back portion said cover comprising a back portion, a flap attached to the top of the back portion of the cover and permanently forming a pocket to receive the top of the back portion of the seat, flaps at the respective sides of the cover, snap fasteners on the flaps to secure the flaps to the back portion of the seat, upholstery secured to the cover and adapted to lie between it and the back portion of the seat, and means to secure the cover between the cushion and the back portion of the seat.

This specification signed this 15th day of June A. D. 1928.

ALFRED F. MASURY.